United States Patent

Agarwal et al.

(10) Patent No.: US 10,915,304 B1
(45) Date of Patent: Feb. 9, 2021

(54) SYSTEM OPTIMIZED FOR PERFORMING SOURCE CODE ANALYSIS

(71) Applicant: DevFactory Innovations FZ-LLC, Dubai Media City (AE)

(72) Inventors: Nilesh Agarwal, Gurgaon (IN); Pranet Verma, London (GB); Piyush Agarwal, Kolkata (IN)

(73) Assignee: DevFactory Innovations FZ-LLC

(*) Notice: Subject to any disclaimer, the term of this patent is extended or adjusted under 35 U.S.C. 154(b) by 127 days.

(21) Appl. No.: 16/027,072

(22) Filed: Jul. 3, 2018

(51) Int. Cl.
*G06F 8/41* (2018.01)
*G06F 16/245* (2019.01)
*G06F 16/248* (2019.01)
*G06F 16/901* (2019.01)

(52) U.S. Cl.
CPC ............ *G06F 8/427* (2013.01); *G06F 16/245* (2019.01); *G06F 16/248* (2019.01); *G06F 16/9024* (2019.01)

(58) Field of Classification Search
CPC .... G06F 16/9024; G06F 8/427; G06F 16/245; G06F 16/248
USPC ........................................................ 717/144
See application file for complete search history.

(56) References Cited

U.S. PATENT DOCUMENTS

| | | | | |
|---|---|---|---|---|
| 9,235,494 | B2* | 1/2016 | Gautam | G06F 11/3616 |
| 2015/0081739 | A1* | 3/2015 | Xu | G06F 16/256 707/792 |
| 2015/0302300 | A1* | 10/2015 | Fletcher | G06F 16/9024 706/11 |
| 2016/0092527 | A1* | 3/2016 | Kang | G06F 16/9024 707/756 |
| 2017/0060958 | A1* | 3/2017 | Van Rest | G06F 16/9024 |
| 2018/0018402 | A1* | 1/2018 | Vogler | G06F 16/9024 |
| 2018/0143826 | A1* | 5/2018 | Crabtree | G06F 8/71 |
| 2018/0173727 | A1* | 6/2018 | Kreutzer | G06F 16/532 |
| 2018/0329953 | A1* | 11/2018 | Weld | G06F 16/278 |
| 2018/0364992 | A1* | 12/2018 | Yamamoto | G06F 8/427 |
| 2018/0373507 | A1* | 12/2018 | Mizrahi | G06F 16/951 |
| 2019/0052602 | A1* | 2/2019 | Abraham | G06F 12/14 |

* cited by examiner

*Primary Examiner* — Lewis A Bullock, Jr.
*Assistant Examiner* — Theodore E Hebert
(74) *Attorney, Agent, or Firm* — Terrile, Cannatti & Chambers LLP

(57) ABSTRACT

A computer system for analyzing source code is disclosed. The computer system includes a processor and electronic memory storage. The electronic memory storage includes source code and executable instructions. The processor runs the executable instructions to: access the source code from the electronic memory storage; analyze code elements of the accessed source code to extract node data, edge data, and bindings data; and store the node data, edge data, and bindings data, in a graph database structure in the electronic memory storage.

19 Claims, 12 Drawing Sheets

| TABLE 1 EXEMPLARY NODES ||| 
|---|---|---|
| Accessor | AnonymousMethodExpression | AnonymousTypeCreateExpression |
| ArrayCreateExpression | ArrayInitializerExpression | ArraySpecifier |
| AsExpression | AssignmentExpression | Attribute |
| AttributeSection | BaseReferenceExpression | BinaryOperatorExpression |
| Block | BreakStatement | CaseLabel |
| CastExpression | CatchClause | ComposedType |
| ConditionalExpression | Constraint | ConstructorInitializer |
| ContinueStatement | DefaultValueExpression | DelegateDeclaration |
| DestructorDeclaration | DirectionExpression | EmptyStatement |
| EnumMemberDeclaration | ExpressionStatement | FieldDeclaration |
| FieldDeclaration | ForStatement | ForeachStatement |
| IdentifierExpression | IfStatement | IndexerDeclaration |
| IndexerExpression | InvocationExpression | IsExpression |
| LambdaExpression | LockStatement | MemberReferenceExpression |
| MemberType | MethodDeclaration | NamedArgumentExpression |
| NamedExpression | NamespaceDeclaration | NullReferenceExpression |
| ObjectCreateExpression | OperatorDeclaration | ParenthesizedExpression |
| PragmaWarningPreprocessorDirective | PreProcessorDirective | PrimitiveExpression |
| PrimitiveType | PropertyDeclaration | QueryContinuationClause |
| QueryExpression | QueryFromClause | QueryGroupClause |
| QueryLetClause | QueryOrderClause | QueryOrdering |
| QuerySelectClause | QueryWhereClause | ReturnStatement |
| SimpleName | SimpleType | SingleArrayInitializerExpression |
| SingleVariableDeclaration | SwitchSection | SwitchStatement |
| SyntaxTree | ThisReferenceExpression | ThrowStatement |
| TryStatement | TypeDeclaration | TypeOfExpression |
| TypeParameterDeclaration | TypeReferenceExpression | UnaryOperatorExpression |
| UncheckedStatement | UsingAliasDeclaration | UsingDeclaration |
| UsingStatement | VariableDeclarationFragment | VariableDeclarationStatement |
| WhileStatement | YieldBreakStatement | YieldReturnStatement |

*FIG. 3*

SYSTEM OPTIMIZED FOR PERFORMING SOURCE CODE ANALYSIS

BACKGROUND OF THE INVENTION

Field of the Invention

The present invention relates in general to the field of electronics, and more specifically to an electronic processing system that is optimized for performing source code analysis.

Description of the Related Art

Source code is a set of computer instructions written in a human-readable format using a computer programming language that can be executed by a processor after being compiled or interpreted into machine-readable instructions. During software development, it is desirable to analyze various aspects of the source code. For example, the relationship between various elements of the source code may be checked to ensure compliance with standard practices and procedures as well as check for errors. Also, an analysis of metrics, such as size and complexity, can be useful.

There are various automated solutions for analyzing source code. Existing solutions frequently do not provide insights into all aspects of the source code that a developer may need. Only a small subset of the software elements needed by the developer are available for analysis. Further, existing solutions often fail to provide means for obtaining custom insights into the source code that may be tailored by the developer. Even in those instances in which the developer may customize the insights for the subset of software elements, the generation of custom queries is complicated. The execution of such custom queries is costly in terms of computer time and resources. Source code analysis becomes particularly difficult to perform when an entire code repository is to be analyzed.

SUMMARY OF THE INVENTION

In at least one embodiment, a computer system analyzes source code by accessing source code from the electronic memory storage and analyzing code elements of the source code to extract node data, edge data, and bindings data. The computer system stores the node data, edge data, and bindings data, in a graph database structure in the electronic memory storage. In at least one embodiment, the computer system generates metrics data for the source code and stores the metrics data in the graph database structure.

In at least one embodiment, the computer system generates one or more relational databases from the source code for conversion to the graph database structure. In at least one embodiment, the computer system generates an abstract syntax tree (AST) including node data and edge data and stores the node data and edge data of the AST in a relational database structure in the electronic memory storage. In at least one embodiment, the computer system uses the AST and source code to generate the bindings data and stores the bindings data in the relational database structure. In at least one embodiment, the computer system converts the data in the relational database structure to the graph database structure.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 3 is a table of exemplary nodes that may be encountered and analyzed in the source code while the computer system optimizes the performance of source code analysis.

DETAILED DESCRIPTION

In at least one embodiment, a computer system executes code graph functions to obtain and merge information from multiple computer code data structures to generate a consolidated, compact code graph that represents source code in a consolidated data structure that provides greater depth of insight into the source code. In at least one embodiment, the code graph functions are source code language agnostic, which provides the code graph functions increased flexibility and applicability to various source code files. In at least one embodiment the code graph functions obtain binding, symbol, syntax, and metric data about source code and combine the data into a comprehensive code graph that increases the visibility of and, thus, human apprehension of the code that facilitates developing advanced insights into the source code. Exemplary insights provided by the consolidated code graph are the synchronization of initialization of static variables, unclosed resources in open try blocks, improper calling of classes, such as the Java language Throwable.printStackTrace( ) class, which is the superclass of all errors and exceptions in the Java language, static calendar and data format objects, empty catch statements, assignments inside conditional expressions, and message chain anti-patterns. In at least one embodiment, the consolidated, compact code graph contains a comprehensive set of data insights into the source code, is pre-generated, and queries are executed on the pre-generated code graph. The code graph facilitates more intuitive pattern recognition and writing/modifying rules.

In at least one embodiment, the code graph database is created through operations in which source code data is extracted to generate one or more intermediate relational databases. In at least one embodiment, nodes of an abstract syntax tree (AST) are extracted from the source code to generate a tree model including the rudimentary node structure of the source code. The AST node data is stored in a relational database. Bindings data and metrics data are generated using the source code and AST node data and stored in the relational database. The relational database is converted to a code graph database, which is quickly and easily queried using a graph query language to formulate more intuitive and insightful structuring of queries when compared to queries used in relational databases. The performance of the computer system is also enhanced in that queries of the code graph database consume less computing power and can be executed in less time than similar queries of source code data structured in a relational database thereby providing substantial technological advances over prior automated source code analysis systems.

Figure 1:
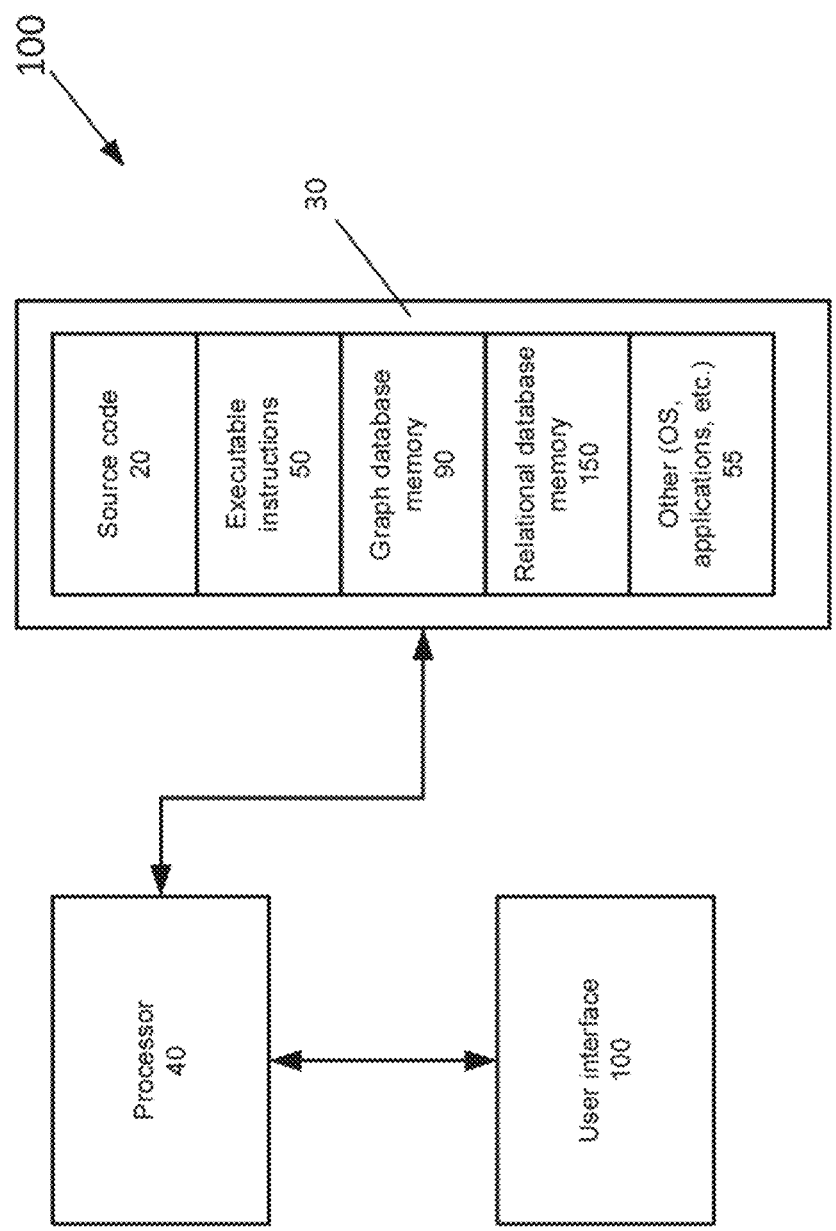
FIG. 1 depicts one embodiment of a computer system optimized for performing source code analysis.

FIG. 1 shows one example of a computer system 10 that is configured to analyze source code 20 stored in memory storage 30 and allow users to effectively formulate and execute queries providing substantial insight into the structure and operation of the source code 20. Computer system 10 is shown in a simplified form but may be implemented in a variety of manners as will be set forth below.

The computer system 10 includes a processor 40 that is configured to access memory storage 30. The memory storage 30 includes, for example, the source code 20 to be analyzed and executable instructions 50. The memory storage 30 can also include other code such as an operating system, other applications, etc. The computer system 10 also includes a display 102 to display a user interface 100.

Figure 2:
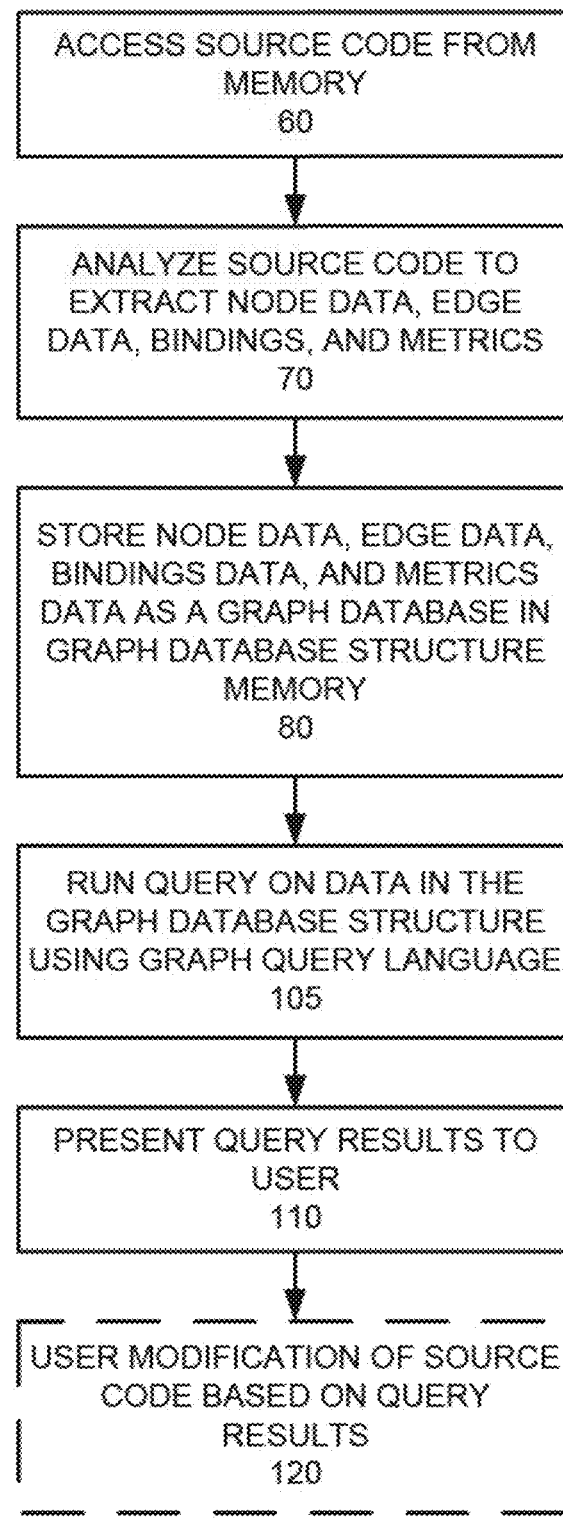
FIG. 2 depicts one example of the operations performed by the computer system to optimize the performance of source code analysis.

The processor 40 executes the instructions 50 to perform operations used to analyze the source code 20. FIG. 2 depicts exemplary operations 200 performed by the computer system 10 to improve the computer system 10 and, for example, allow the computer system 10 to perform non-conventional, non-routine functions. Referring to FIGS. 1 and 2, the source code 20 is accessed from the memory storage 30 by the processor 40 at operation 60. At operation 70, the source code 20 is analyzed to extract node data, edge data, bindings data, and metrics data. At operation 80, the extracted data is stored in a graph database memory 90 in memory storage 30. Additionally, the processor 40 may run the executable instructions 50 to extract metrics data and store the metrics data in the graph database memory 90.

A graph database is a database that uses graph structures for semantic queries with nodes, edges and properties to represent and store data. The relationships allow data in the store to be linked together directly and in many cases retrieved with one operation. Neo4j, having offices in California, provides an exemplary graph database system (referred to herein as "Neo4j") that may be used with the data in the graph database memory 90 shown in FIG. 2.

The data to be included in the graph database memory 90 may vary based on the extent of the analysis to be undertaken on the source code 20. In each instance, however, the graph database memory 90 contains nodes and relationships. Nodes contain properties (key-value pairs) and can be labeled with one or more labels. Relationships are named and directed, and have a start and end node. Relationships can also contain properties. Exemplary nodes that may be encountered in the source code 20 are shown in Table 1 of FIG. 3.

The data stored in the graph database memory 90 may be in the form of a labeled property graph made up of nodes, relationships, properties, and labels. Nodes contain properties. Nodes store properties in the form of arbitrary key-value pairs. In Neo4j, the keys are strings, and the values are the Java string and primitive data types plus arrays of these types. Nodes can be tagged with one or more labels. Labels group nodes together and indicate the roles the nodes play within the dataset. Relationships connect nodes and structure the graph. A relationship has a direction, a single name, a start node, and an end node. Together, the direction and name of a relationship add semantic clarity to the structuring of nodes. Like nodes, relationships can also have properties. The ability to add properties to relationships is particularly useful for providing additional metadata for graph algorithms, adding additional semantics to relationships (including quality and weight), and for constraining queries at runtime.

Some graph databases use native graph storage that is optimized and designed for storing and managing graphs. Not all graph database technologies use native graph storage, however. Some serialize the graph data into a relational database, an object-oriented database, or some other general-purpose data store. In at some embodiments disclosed herein, the graph database structure is based on native graph storage.

The graph database memory 90 may be indexed and have index-free adjacency. With index-free adjacency, the connected nodes physically "point" to each other in the database. In such a graph database, a starting node is usually located initially with an index lookup, and then the index-free adjacency characteristic of the graph database is used to hop from one node to the next node.

Aspects of graph databases differ from relational databases. Relational databases, with the aid of relational database management systems, permit managing the data without imposing implementation aspects like physical record chains. Links between data are stored in the database itself at the logical level, and relational algebra operations (e.g. join) are used to manipulate and return related data in the relevant logical format. The execution of relational queries is possible with the aid of the database management systems at the physical level (e.g. using indexes), which permits boosting performance without modifying the logical structure of the database. This means that graph database modeling will tend to have much more finegrained data models with a higher level of granularity than in a relational model.

With reference again to FIG. 2, a query is run on the data in the graph database memory 90 using a graph query language at operation 105. One such graph query language is Cypher, which is compatible with Neo4j graph database structures. The results of the query may be presented to the user on user interface 100 (FIG. 1) at operation 110. The results may be presented in the form of a visual graph having images representing the nodes and corresponding relationships. The node types and edges may be assigned predetermined shapes, colors, labels, etc. for clarity. Based on the results of the query, in operation 120, the user may modify the source code to optimize it by, for example, correcting errors, editing it to ensure compliance with standard practices and procedures, etc.

Figure 4:
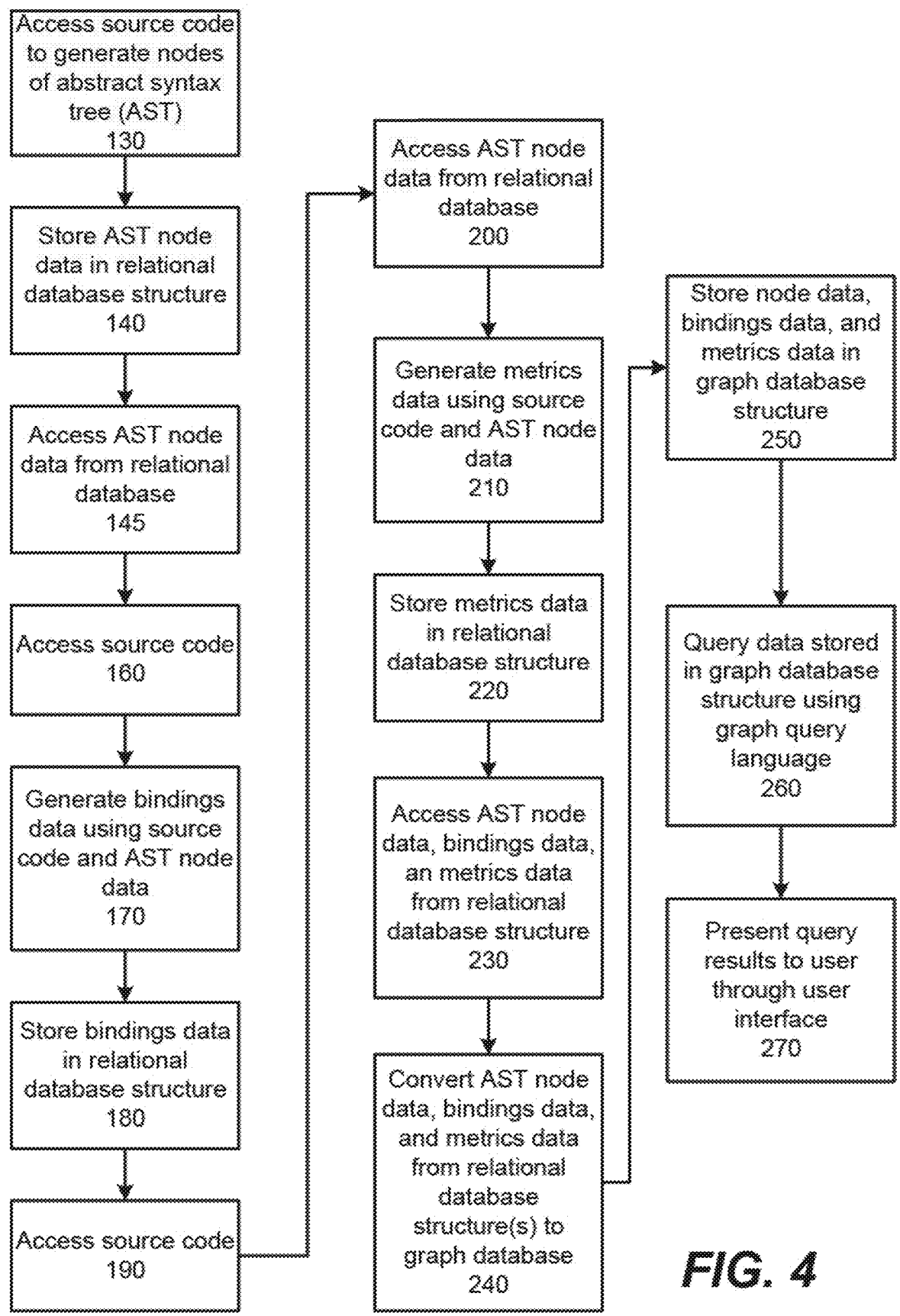
FIG. 4 depicts one manner in which the computer system may implement the operations shown in FIG. 2.

FIG. 4 shows one way the computer system 10 may implement the operations shown in FIG. 2. At operation 130, the source code 20 is accessed to generate the nodes of an abstract syntax tree (AST). The resulting AST is a tree model of the rudimentary node structure of the source code 20. At operation 140, the AST node data is stored in a relational database structure in relational database memory 150 (FIG. 1). At operation 145 the AST node data is accessed from the relational database memory 150, and the source code 20 is accessed at operation 160. Bindings data is generated using the source code and AST node data at operation 170. At operation 180, the bindings data is stored in the relational database memory 150. At operation 190, the source code 20 is again accessed and the AST node data is accessed from the relational database memory 150 at operation 200. The source code 20 and AST node data accessed from the relational database memory 150 are used to generate metrics data at operation 210, which is likewise stored in the relational database memory 150 at operation 220.

The AST node data, bindings data, and metrics data are accessed from the relational database memory 150 at operation 230. The data is then converted to a graph database at operation 240 and stored in the graph database memory 90 at operation 250. At operation 260, the data stored in the graph database memory 90 is queried using a graph query language, such as Cipher, and the results of the query are presented to the user through the user interface at operation 270.

Figure 5:
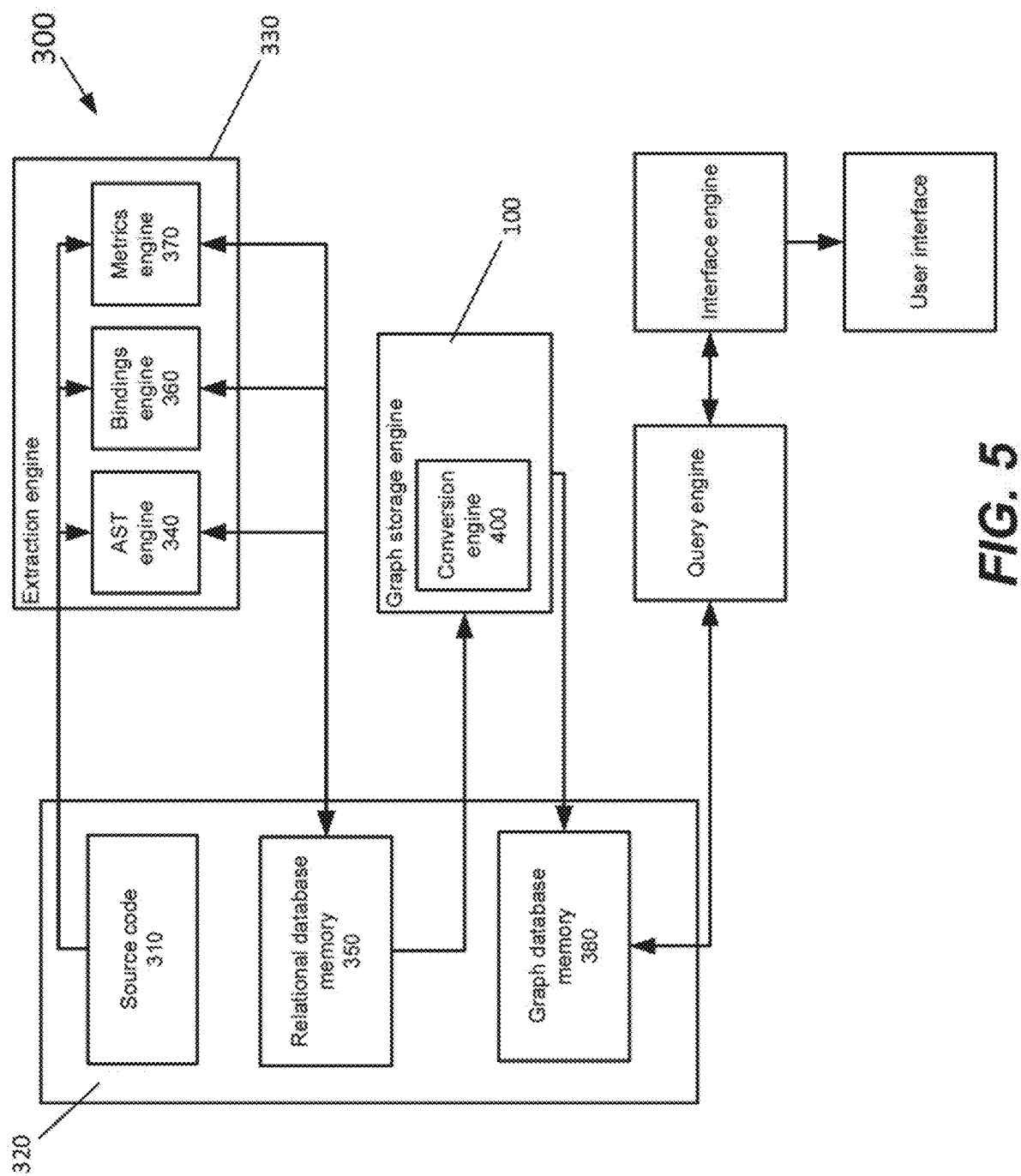
FIG. 5 depicts another embodiment of a computer system optimized for performing source code analysis.

FIG. 5 depicts computer system 300, which represents another embodiment of a computer system 300 for analyzing source code 310 stored in memory storage 320. In this embodiment, the computer system 300 includes one or more processors (not expressly shown) that interact with memory storage 320 and various software engines.

In this embodiment, the computer system 300 includes an extraction engine 330, which is coupled to the one or more processors to extract node data, edge data, and bindings data from the source code 310. In FIG. 5, the extraction engine 330 includes an abstract syntax tree (AST) engine 340. One example of the pseudo-code that may be executed to implement the AST engine 340 includes:

```
addEdge(parent, child, label) {
   //create an edge from "parent" to "child" with label
      "label" in EdgeTable
}
addNode(astNode, properties, label) {
   // Create an node entry in NodeTable corresponding to the
      arguments
   //and return it
}
astNodeHandler.dfs( ) {
   properties=fetchProperties (astNode)
   dbNode=addNode(astNode, properties, customNodeLa-
      bel)
   processChild(childASTNode1, dbNode.id, specificEdge-
      Label1)
   processChild(childASTNode2, dbNode.id, specificEdge-
      Label2)
   processChild(childASTNode3, dbNode.id, specificEdge-
      Label3)
   . . .
   return dbNode.id;
}
processChild(childNode, parentID, edgeLabel) {
   handler=findHandler(childNode)
   id=handler.dfs( )
   addEdge(parentID, id, edgeLabel)
}
```

The node data extracted by the AST engine 340 is stored as a relational database in relational database memory 350.

In FIG. 5, the extraction engine 330 also includes a bindings engine 360. The bindings engine 360 accesses the source code 310 from memory storage 320 as well as the node data stored in the relational database memory 350 by the AST engine 340. One example of the pseudo-code that may be executed to implement the bindings engine 360 includes:

```
injectX( ) {
   Node
      x=nodeRepositoryCrud.findByTypeAndFileAndLineAndCol
      ( )
   x.setProperties( . . . )
   nodeRepository.save(x)
}
runNodeParser( ) {
   injectMethods( )
   injectPackage( )
   injectFiles( )
   injectClass( )
}
runEdgeParser( ) {
   classMappings(db, sourceProject);
   methodMappings(db, sourceProject);
   packageMappings(db, sourceProject);
   variableMappings(db, sourceProject);
}
```

The extraction engine 330 also includes a metrics engine 370, which is configured to extract metrics information using the source code 310 and the data stored in the relational database memory 350.

The computer system 300 also includes a graph storage engine 390 that is coupled to the one or more processors to access the node data, the edge data, and the bindings data from the relational database memory 350. This data is then stored as a graph database in graph database memory 380. To this end, the graph storage engine 390 includes a conversion engine 400 that accesses the data in the relational database memory 350 and converts that data to the graph database structure in the graph database memory 380. One example of the pseudo-code that may be executed to implement the graph storage engine 390 includes:

```
main( ) {
   processNodes( )
   processEdges( )
   addParameterBindingEdges( )
   addConstructorInformation( )
}
createNode (node) {
   // save node in neo4j database and return ID of created
      node.
}
createEdge (from, to, label) {
   // save edge from "from" to "to" with label "label" in
      neo4j database
}
processNode( ) {
   Foreach node in NodeTable:
      node.graphid=createNode(node)
}
processEdge( ) {
   Foreach edge in EdgeTable:
      createEdge(edge.fromNode.graphID,   edge.toNode-
         .graphID, edge.label)
      createEdge(edge.fromNode.graphID,   edge.toNode-
         .graphID, "tree_edge")
}
```

FIGS. 6-9 illustrate the result of the various operations that occur during the analysis of the source code 310. Although there are substantial number of different node types that may be analyzed (FIG. 3), only five nodes are discussed here. All of the nodes of FIGS. 6-9 relate to corresponding method nodes.

A 'MethodDeclaration' node has the following outgoing edges:
   Zero or more 'parameter' edges to 'SingleVariableDeclaration' nodes
   A 'return' edge to a 'SimpleName' node
   A 'body' edge to a 'Block' node
   A 'throws' edge (Java only)

If Method A calls Method B, then there is a "CALLS" and "CALLS_BY" edge between them.

A 'MethodInvocation' node has the following outgoing edges:
- An 'INVOKES' edge to the 'MethodDeclaration' node corresponding to this call
- Zero or more 'argument' edges
- A 'target' edge to an entity (usually a MethodReferenceExpression). This entity has an outgoing 'name' and an outgoing 'invoked_by' edge to the entity which called this expression . . . .

There is also a 'binding' edge between the 'arguments' of an InvocationExpression node and the 'parameters' of its corresponding MethodDeclaration node.

Figure 6:
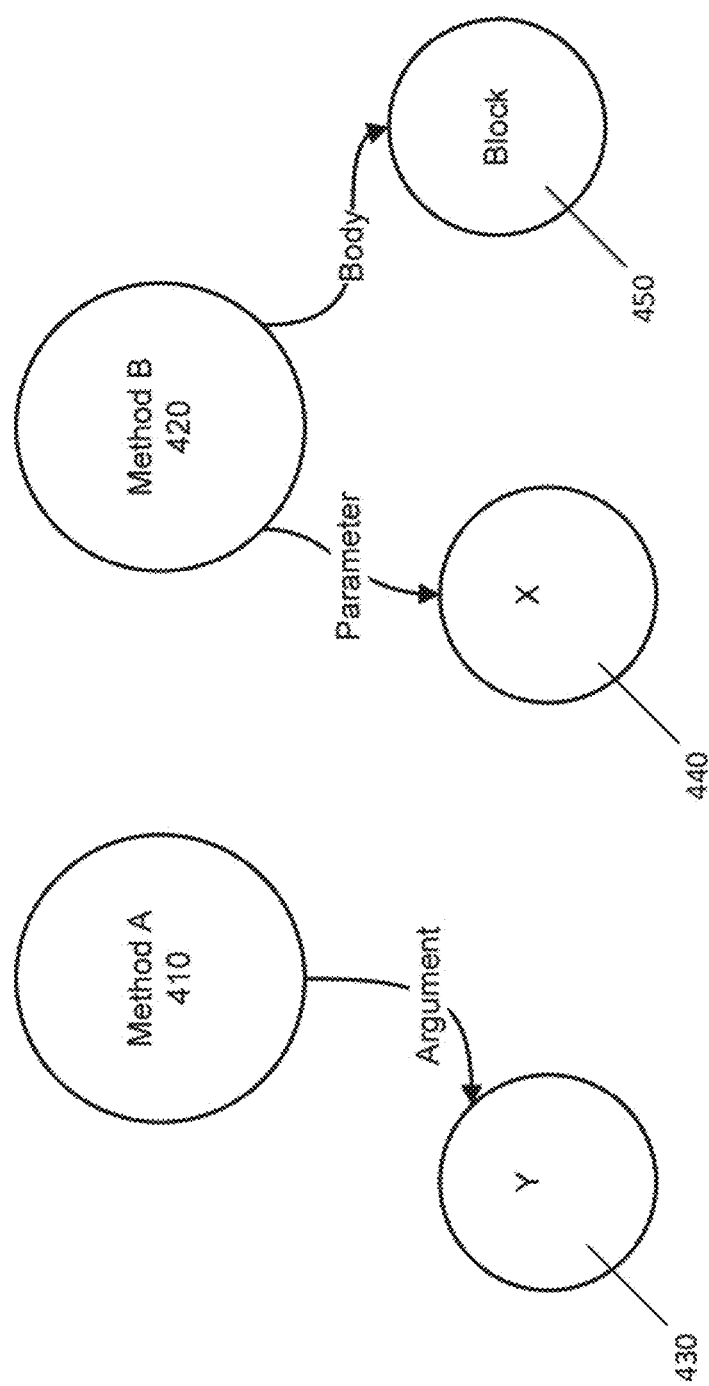
FIG. 6-FIG. 9 depicts the result of the various operations that occur during the analysis of the source code as depicted in FIG. 4.

In FIG. 6, the AST operation has identified two methods, method 410 and method 420, as well as an argument 430, a parameter 440, and a block 450. As shown, argument 430 is an argument of method 410, parameter 440 is a parameter of method 420, and block 450 is the body of method 420. Thus, the basic relationship between these nodes of the source code 310 has been extracted in the AST operation.

Figure 7:
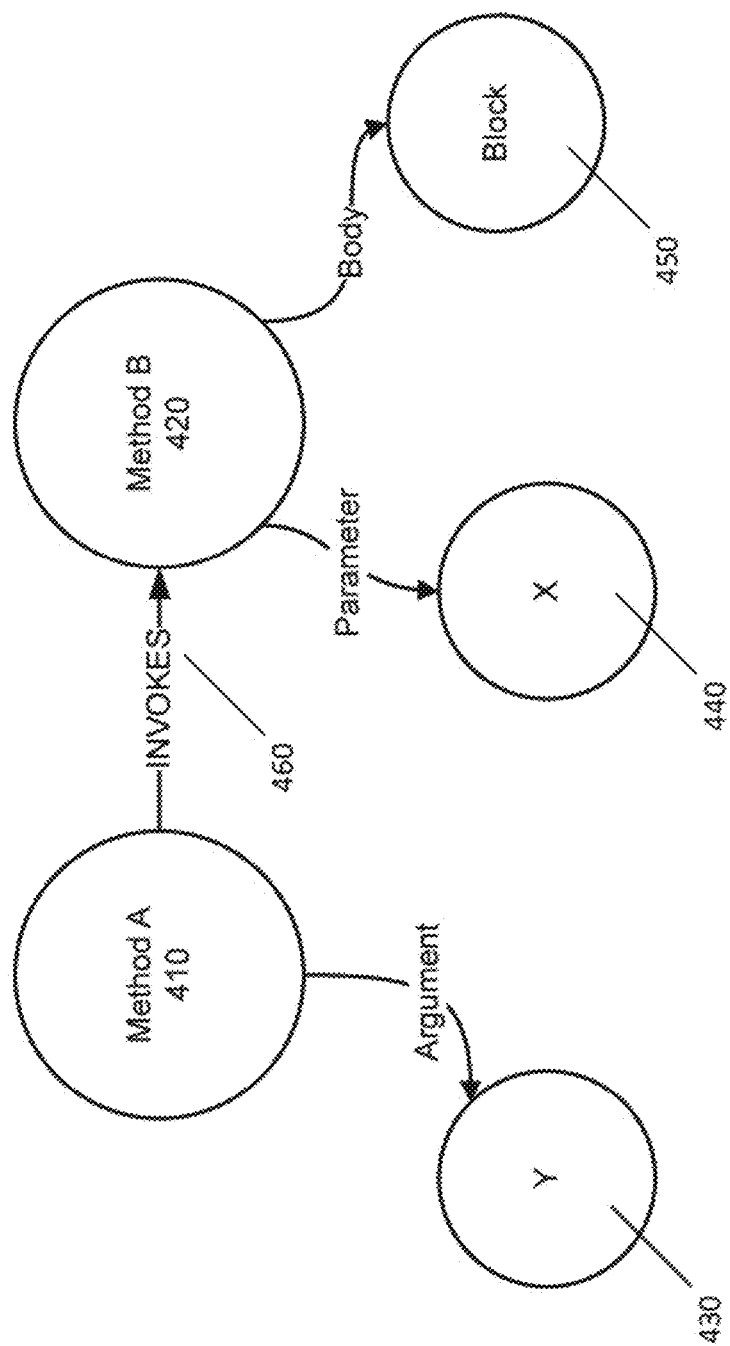

With reference to FIG. 7, at least a subset of the bindings operation has been executed. In this regard, an INVOKES edge 460 has been added from method 410 to method 420.

Figure 8:
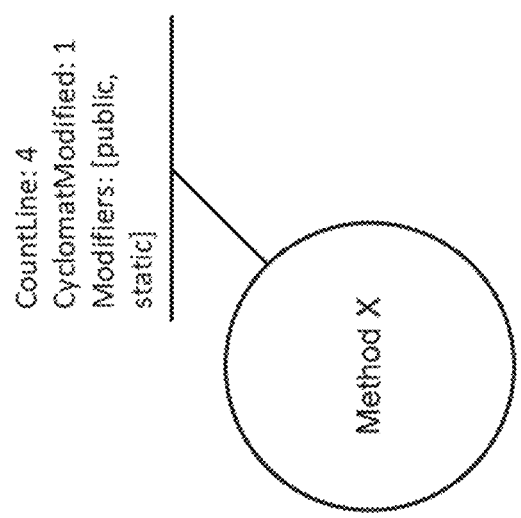

FIG. 8 shows the extraction and display of metrics data for exemplary Method A. In this example, three metrics have been extracted for Method A, including line count [Countline:4], types of modifiers [Modifiers:[public, static]], and cyclomatic complexity [CyclomatModified: 1].

Figure 9:
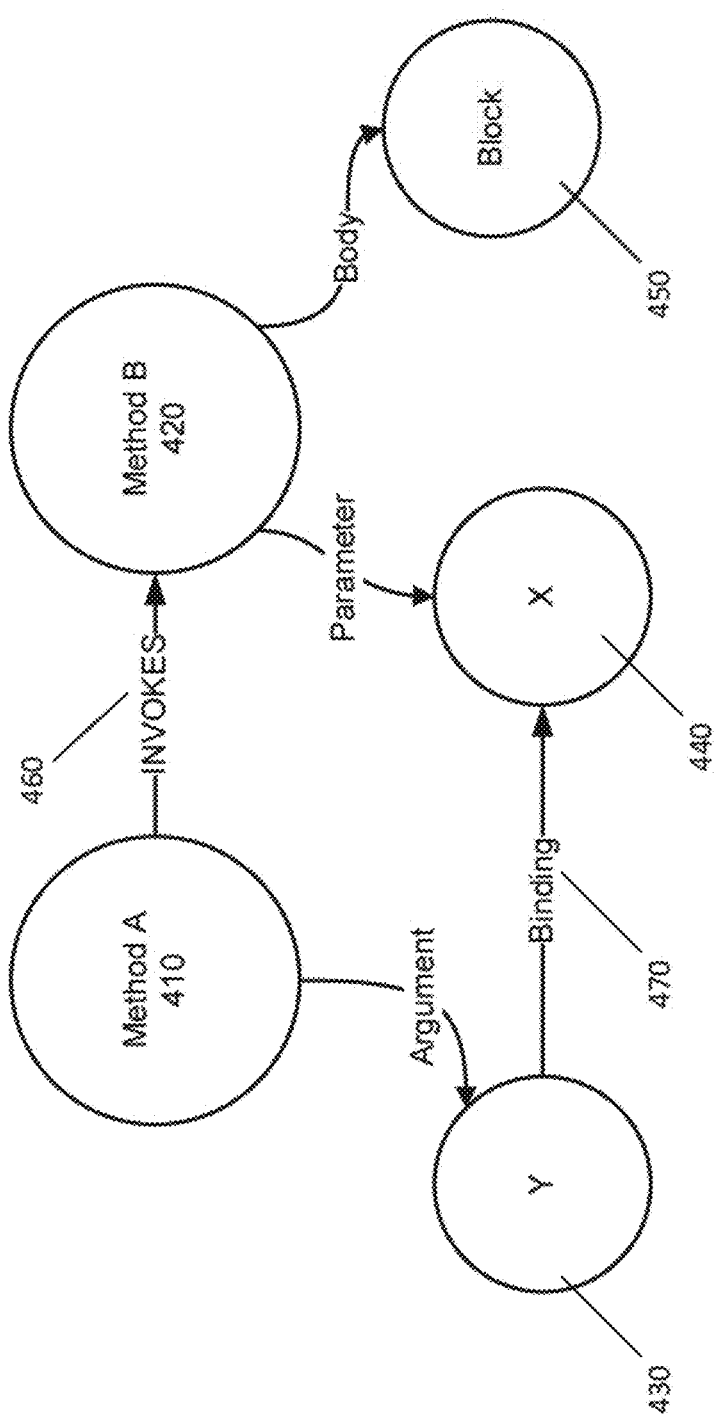

With reference to FIG. 9, the graph database (based on the limited number of nodes shown in FIG. 6) has been completed. More particularly, the bindings have been completed by adding a binding edge 470. The binding edge 470 shows that the argument 430 of method 410 is passed to parameter 440 of method 420.

Nodes other than methods are frequently encountered in source code. Such node types include Try-catch-finally Blocks, Conditional statements, and loop statements. Knowing the characteristics of these node types helps in structuring the relationships between node types in the graph database.

A 'TryStatement' node represents a try-catch-finally block. It has the following outgoing edges:
- A 'try' edge to a 'Block' node.
- Zero or more 'catch' edges to 'CatchClause' nodes.
- An optional 'finally' edge to a 'Block' node.
- A 'resources' edge (e.g., in Java).

A 'CatchClause' node is also a try-catch-finally block and has the following outgoing edges:
- A 'declaration' edge to a 'SingleVariableDeclaration' node.
- A 'body' edge to a 'Block' node.
- A 'condition' edge (e.g., in C#).

The 'IfStatement' and 'ConditionalExpression' are each examples of conditional statement nodes. They have the following outgoing edges:
- A 'condition' edge.
- A 'then' edge. This path is taken when the condition is true.
- A 'else' edge (optional for "IfStatement").

The ForeachStatement, ForStatement, DoWhileStatement, and WhileStatement are examples of loop statement nodes. All have outgoing 'then' edges. This edge leads to the body of the loop. The ForStatement additionally has 'initializer', and 'update' edges.

The ForeachStatement additionally has following outgoing edges:
- A 'declaration' edge to a 'SingleVariableDeclaration' node.
- An 'expression' edge to the variable being iterated over.

With reference again to FIG. 5, the computer system 300 also includes a query engine 500, an interface engine 510, and a user interface 520. The user enters queries through user interface 520. These queries are submitted to the query engine 500 through interface engine 510. The query engine 500, in turn, runs the query on the data in the graph database memory 380 and returns the results to the user interface 520 through the interface engine 510.

Figure 10:
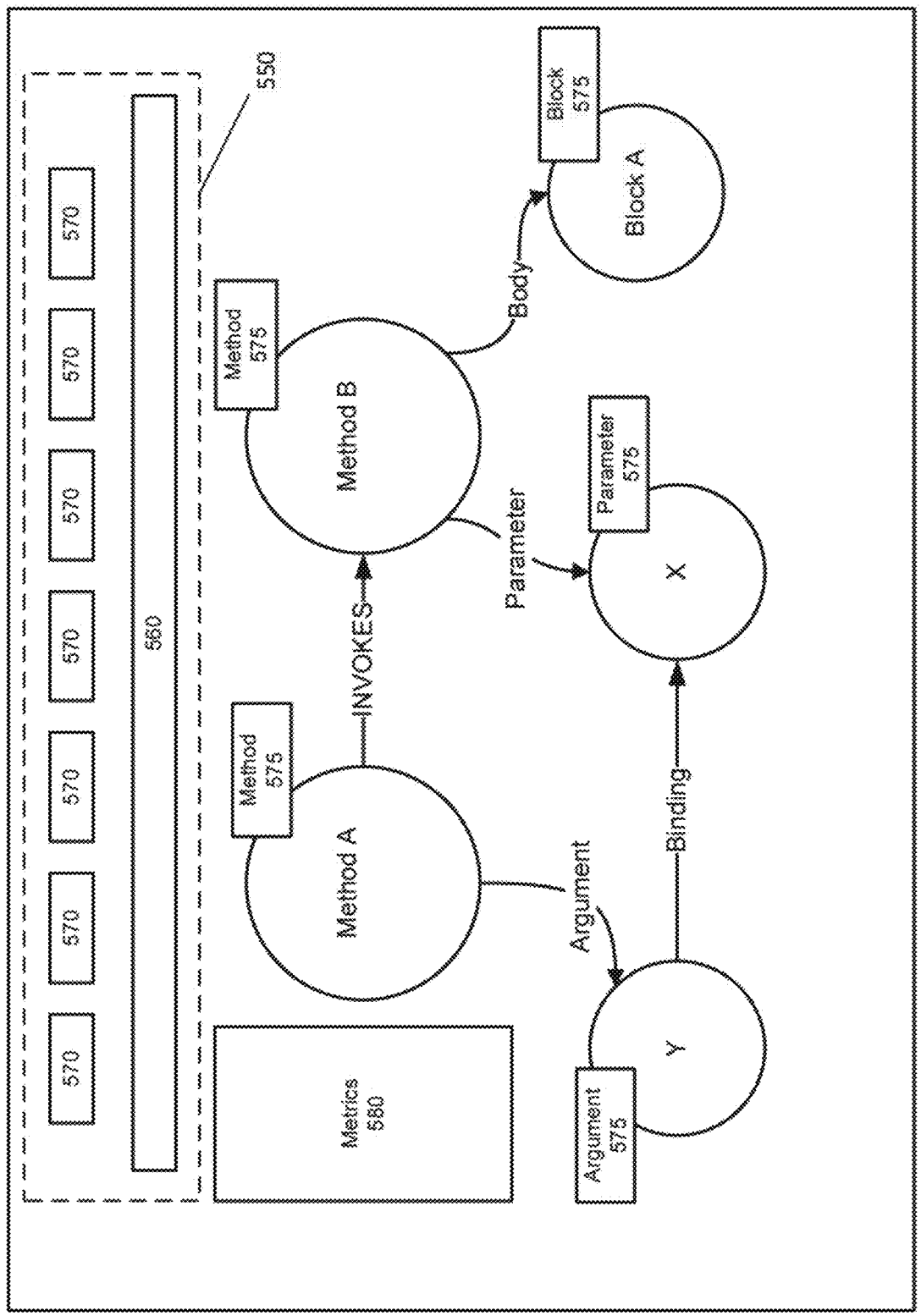
FIG. 10 depicts a screen shot of one embodiment of a user interface that may be used in a computer system optimized for performing source code analysis.

FIG. 10 is a screen shot of a display of the user interface 100. In this example, the display includes a query entry region 550 having a text entry area 560. The text entry area 560 is used to enter queries using a graph query language, such as Cipher. The query entry region also includes a plurality of selectable elements 570, where each element 570 is associated with a corresponding predetermined query. Selection of an element 570 by the user causes the interface engine 510 to submit the corresponding query to the query engine 500. The results of the query are passed from the query engine 500 to the interface engine 510 for display. In the example shown in FIG. 10, the query results are displayed as labeled nodes and edges. Different colors and/or shapes may be used to display different node and/or edge types. Additionally, or in the alternative, the node types may appear as labels 575 adjacent to the corresponding node.

User selection of a node may display the corresponding metrics associated with that node. In one example, the user interface 100 includes a metrics display region 580, which presents the metrics for a selected node.

Queries that would be complicated to enter and execute on a relational database are simpler to formulate and faster to execute on a graph database. Although there are a myriad of graph database queries that may be executed, a small sample of them are described here. All of the sample queries are shown using the Cipher graph query language.

In one example, the query is formulated to find all distinct node types. The following Cipher statements may be used to execute such a query:
 match (n)
 return collect(distinct labels(n))

In another example, the query is formulated to find all distinct edge types. The following Cipher statements may be used to execute such a query:
 match ( )-[r]-( )
 return collect(distinct type(r))

In another example, the query is formulated to find all different type of outgoing edges from a 'MethodDeclaration' node. The following Cipher statements may be used to execute such a query:
 match (n:MethodDeclaration)-[r]→( )
 return collect(distinct type(r))
In this query, the direction of the edge is specified.

In another example, the query is formulated to find all different types of outgoing AST edges from a 'MethodDeclaration' node. The following Cipher statements may be used to execute such a query:
 match (n:MethodDeclaration)-[r:tree_edge]→(m)
 with n, m
 match (n)-[r]→(m)
 return collect(distinct type(r))

In another example, the query is formulated to find all if statements without an associated 'else'. The following Cipher statements may be used to execute such query:

match(n:IfStatement)
where not (n)-[:else]→( )
return n

In another example, the query is formulated to find all nodes with an outgoing 'body' and an outgoing 'statement' edge. The following Cipher statements may be used to execute such a query:

match ( )←[:body]-(n)-[:statement]→( )
return n

In this query, both edges are outgoing from n.

In another example, the query is formulated to find all methods with at-least three parameters, the following Cipher statements may be used to execute such a query:

match (n:MethodDeclaration)-[r:parameter]→( )
with n, count(r) as cr
where cr>=3
return n In another example, the query is formulated to find all constructors. The following statements may be used to execute such a query:

Match (n:MethodDeclaration) where n.isConstructor='True' return n

In another example, the query is formulated to ensure that all resources have been closed. The following statements may be used to execute such a query:

```
match (cc:JAVA_CLOSE_CONSTANTS) with collect(cc) as cc
match (tryBlock:TryStatement)-[:try]->( )-[:tree_edge\INVOKES*0..20]-
>(setpoint)<-
    [:SET_BY]-(resource)<-[:fragment*0 ..1]-( )[:type]->(k)
  where reduce(s = false, x in cc \ s or (k.properties contains x. name))
  and ( (:ForStatement)-[:tree_edge\INVOKES*0..20]->(setpoint)
  or not ( (resource)-[:USE_BY]->( )<-[:invoked_by]-
    ({properties:"{\"name\":\"close\"}"})<-
    [:tree_edge|INVOKES*0..20]-( )<-
    [:finally]-(tryBlock)
  or (resource)-[:USE_BY]->( )-[:binding]->( )-[:USE_BY]-
  >( )<-[:invoked_by]-({
    properties:"{\"name\":\"close\"}"})<-
    [:tree_edge|INVOKES*0..20]-( )<-
    [:finally]-(tryBlock) ))
return resource
```

Figure 11:
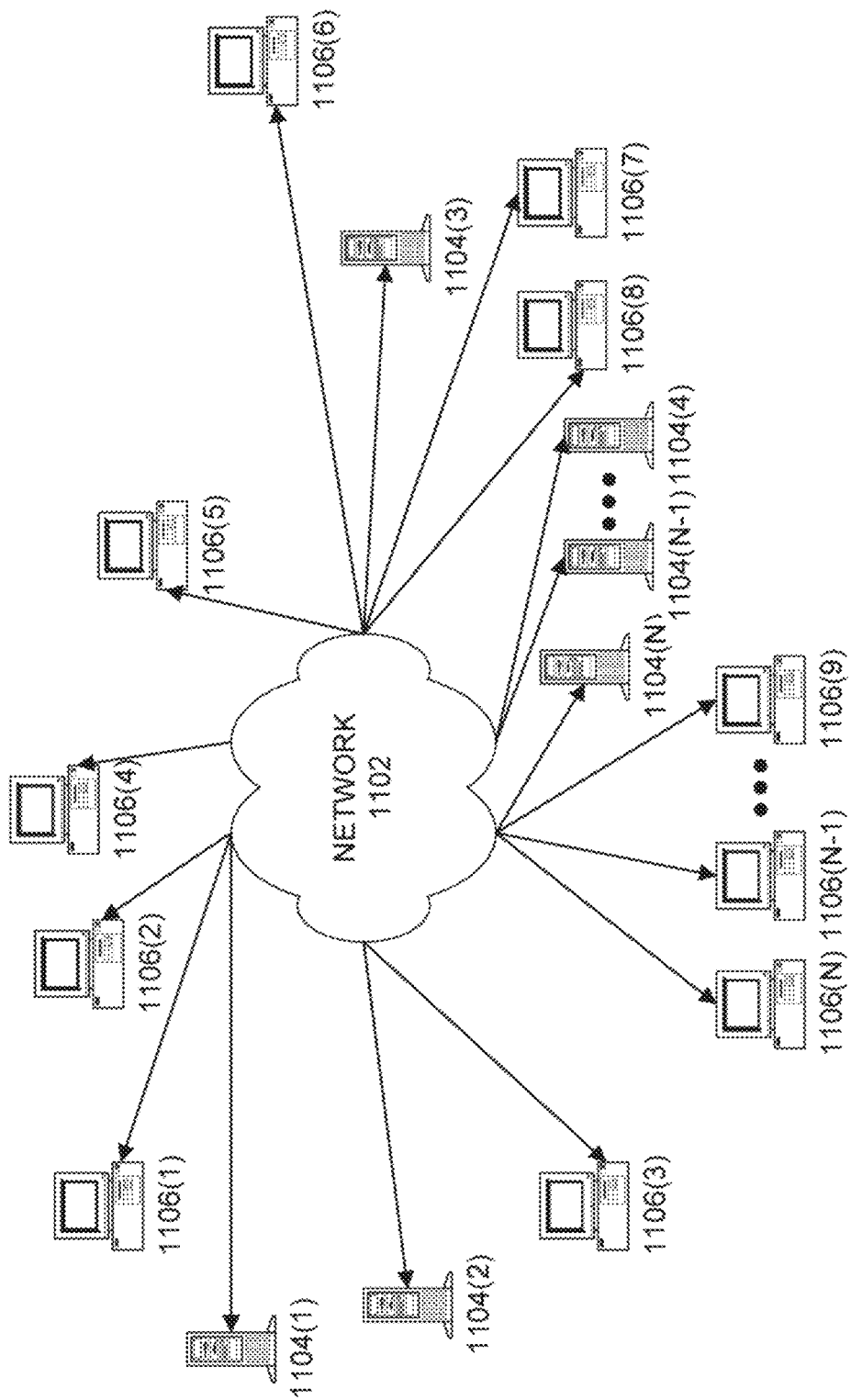
FIG. 11 depicts an exemplary network environment in which the computer system optimized for performing source code analysis may be practiced.

FIG. 11 depicts a network environment in which a system optimized for performing source code analysis may be practiced. Network 1102 (e.g. a private wide area network (WAN) or the Internet) includes a number of networked server computer systems 1104(1)-(N) that are accessible by client computer systems 1106(1)-(N), where N is the number of server computer systems connected to the network. Communication between client computer systems 1106(1)-(N) and server computer systems 1104(1)-(N) typically occurs over a network, such as a public switched telephone network over asynchronous digital subscriber line (ADSL) telephone lines or high-bandwidth trunks, for example communications channels providing T1 or OC3 service. Client computer systems 1106(1)-(N) typically access server computer systems 1104(1)-(N) through a service provider, such as an internet service provider ("ISP") by executing application specific software, commonly referred to as a browser, on one of client computer systems 1106(1)-(N).

Client computer systems 1106(1)-(N) and/or server computer systems 1104(1)-(N) may be, for example, computer systems of any appropriate design, including a mainframe, a mini-computer, a personal computer system including notebook computers, a wireless, mobile computing device (including personal digital assistants, smart phones, and tablet computers). When programmed to implement at least one embodiment of the system optimized for performing source code analysis, the computer systems are specialized machines. These computer systems are typically information handling systems, which are designed to provide computing power to one or more users, either locally or remotely. Such a computer system may also include one or a plurality of input/output ("I/O") devices coupled to the system processor to perform specialized functions. Tangible, non-transitory memories (also referred to as "storage devices") such as hard disks, compact disk ("CD") drives, digital versatile disk ("DVD") drives, and magneto-optical drives may also be provided, either as an integrated or peripheral device. In at least one embodiment, the system optimized for performing source code analysis can be implemented using code stored in a tangible, non-transient computer readable medium and executed by one or more processors. In at least one embodiment, the system optimized for performing source code analysis can be implemented completely in hardware using, for example, logic circuits and other circuits including field programmable gate arrays.

Figure 12:
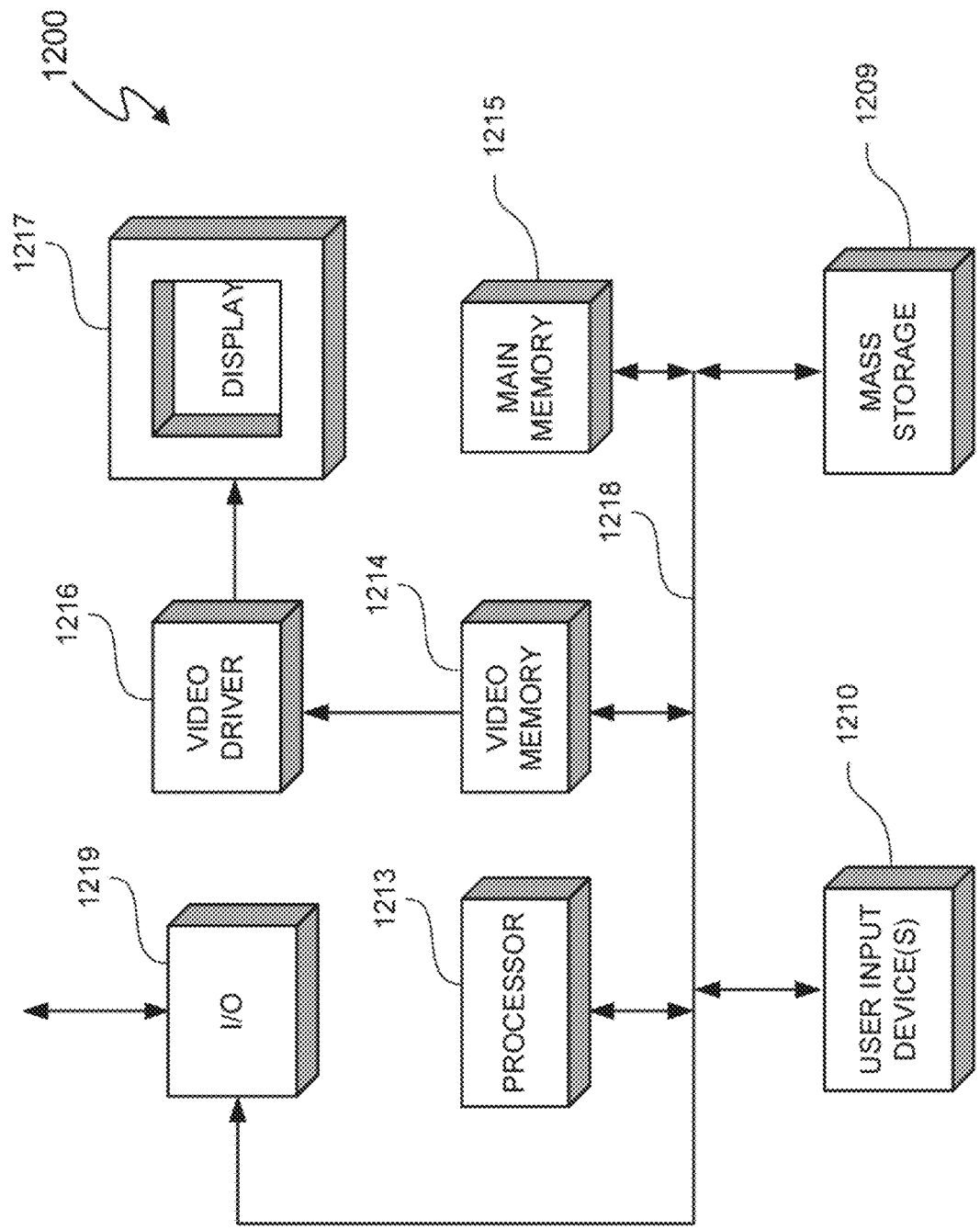
FIG. 12 depicts another exemplary computer system architecture that may be used for optimized source code analysis.

Embodiments of the system optimized for performing source code analysis can be implemented on a computer system such as a general-purpose computer 1200 illustrated in FIG. 12. The computer 1200 can be a dedicated computer system or a virtual, emulated system located in, for example, a cloud computing environment. Input user device(s) 1210, such as a keyboard and/or mouse, are coupled to a bi-directional system bus 1218. The input user device(s) 1210 are for introducing user input to the computer system and communicating that user input to processor 1213. The computer system of FIG. 12 generally also includes a non-transitory video memory 1214, non-transitory main memory 1215, and non-transitory mass storage 1209, all coupled to bi-directional system bus 1208 along with input user device(s) 1210 and processor 1213. The mass storage 1209 may include both fixed and removable media, such as a hard drive, one or more CDs or DVDs, solid state memory including flash memory, and other available mass storage technology. Bus 1218 may contain, for example, 32 of 64 address lines for addressing video memory 1214 or main memory 1215. The system bus 1218 also includes, for example, an n-bit data bus for transferring DATA between and among the components, such as processor 1213, main memory 1215, video memory 1214 and mass storage 1109, where "n" is, for example, 32 or 64. Alternatively, multiplex data/address lines may be used instead of separate data and address lines.

I/O device(s) 1219 may provide connections to peripheral devices, such as a printer, and may also provide a direct connection to a remote server computer systems via a telephone link or to the Internet via an ISP. I/O device(s) 1219 may also include a network interface device to provide a direct connection to a remote server computer systems via a direct network link to the Internet via a POP (point of presence). Such connection may be made using, for example, wireless techniques, including digital cellular telephone connection, Cellular Digital Packet Data (CDPD) connection, digital satellite data connection or the like. Examples of I/O devices include modems, sound and video devices, and specialized communication devices such as the aforementioned network interface.

Computer programs and data are generally stored as instructions and data in a non-transient computer readable medium such as a flash memory, optical memory, magnetic memory, compact disks, digital versatile disks, and any other type of memory. The computer program is loaded from a memory, such as mass storage 1209, into main memory 1215 for execution. Computer programs may also be in the form of electronic signals modulated in accordance with the computer program and data communication technology when transferred via a network. The method and functions relating to system optimized for performing source code analysis may be implemented in a computer program alone or in conjunction with web pages created using hypertext markup language or other language compatible with one or more types of web browsers. In at least one embodiment, Java applets or any other technology is used with web pages to allow a user of a web browser to make and submit selections and allow a client computer system to capture the user selection and submit the selection data to a server computer system.

The processor 1213, in one embodiment, is a microprocessor manufactured by Motorola Inc. of Illinois, Intel Corporation of California, or Advanced Micro Devices of California. However, any other suitable single or multiple microprocessors or microcomputers may be utilized. Main memory 1215 is comprised of dynamic random access memory (DRAM). Video memory 1214 is a dual-ported video random access memory. One port of the video memory 1214 is coupled to video amplifier 1216. The video amplifier 1216 is used to drive the display 1217. Video amplifier 1216 is well known in the art and may be implemented by any suitable means. This circuitry converts pixel DATA stored in video memory 1214 to a raster signal suitable for use by display 1217. Display 1217 is a type of monitor suitable for displaying graphic images.

The computer system described above is for purposes of example only. The system optimized for performing source code analysis may be implemented in any type of computer system or programming or processing environment. It is contemplated that the system optimized for performing source code analysis might be run on a stand-alone computer system, such as the one described above. The system optimized for performing source code analysis might also be run from a server computer systems system that can be accessed by a plurality of client computer systems interconnected over an intranet network. Finally, the system optimized for performing source code analysis may be run from a server computer system that is accessible to clients over the Internet.

Although embodiments have been described in detail, it should be understood that various changes, substitutions, and alterations can be made hereto without departing from the spirit and scope of the invention as defined by the appended claims.

What is claimed is:

1. A computer system for analyzing source code, wherein the computer system includes a processor and electronic memory storage, the electronic memory storage including source code and executable instructions, during operation the processor runs the executable instructions to:
   access the source code from the electronic memory storage;
   analyze code elements of the accessed source code to extract node data, edge data, and bindings data, wherein running the executable instructions extraction of the node data, edge data, and bindings data comprises:
      generating nodes of an abstract syntax tree (AST) from the accessed source code, wherein the AST is a tree model of a rudimentary node structure of the source code;
      storing AST node data in a relational database structure in a relational database;
      accessing the source code and the AST node data in the relational database;
      generating the node data, the edge data, and the bindings data from the source code and the AST node data in the relational database;
   converting the node data, edge data, and bindings data, into a graph database structure; and
   storing the graph database structure in the electronic memory storage to facilitate human apprehension of the source code.

2. The computer system of claim 1, wherein the processor runs the executable instructions to generate metrics data, wherein the metrics data is stored in the graph database structure in the electronic memory storage.

3. The computer system of claim 1, wherein the processor runs the executable instructions to generate the abstract syntax tree (AST) including node data and edge data.

4. The computer system of claim 3, wherein the processor runs the executable instructions to store the node data and edge data of the AST in a relational database structure in the electronic memory storage.

5. The computer system of claim 4, wherein the processor runs the executable instructions on the node data of the AST and accessed source code to generate the bindings data, wherein the bindings data is stored in the relational database structure in the electronic memory storage.

6. The computer system of claim 5, wherein the processor runs the executable instructions on the relational database structure in the electronic memory storage to convert the relational database structure to the graph database structure.

7. The computer system of claim 1, wherein the data in the graph database structure includes parameters and arguments, and binding edges between the parameters and arguments.

8. The computer system of claim 1, wherein the node data in the graph database structure includes method nodes and edges between the method nodes, wherein the edges between the method nodes include INVOKES edges and INVOKED BY edges.

9. The computer system of claim 1, the computer system further comprising a user interface, wherein the processor runs the executable instructions to run a graph query language on the graph database structure to generate query results for presentation on the user interface.

10. The computer system of claim 9, wherein the processor runs the executable instructions to present the query results in the form of a visual graph on the user interface.

11. The computer system of claim 9, wherein the processor runs the executable instructions to present selectable visual objects on the user interface for selecting one or more predetermined quenes.

12. A computer system comprising:
   one or more processors;
   memory storage coupled to the one or more processors, wherein the memory storage includes source code and executable instructions and the executable instructions include engines comprising:
      an extraction engine coupled to the one or more processors to extract node data, edge data, and bindings data from the source code;
      an AST and data generation engine coupled to the one or more processors to:
         generate nodes of an abstract syntax tree (AST) from the accessed source code, wherein the AST is a tree model of a rudimentary node structure of the source code;
         store AST node data in a relational database structure in a relational database;

access the source code and the AST node data in the relational database;

generate the node data, the edge data, and the bindings data from the source code and the AST node data in the relational database;

a graph storage engine coupled to the one or more processors to store the node data, edge data, and bindings data in a graph database structure in the memory storage;

a query engine coupled to the one or more processors to execute queries using a graph query language on data stored in the graph database structure; and a user interface engine coupled to the one or more processors to facilitate entry of queries for use by the query engine and to present query results.

13. The computer system of claim 12, wherein the extraction engine further extracts metrics data from the source code.

14. The computer system of claim 12, wherein the extraction engine further comprises a bindings engine using the AST data and the source code to generate bindings data, wherein the bindings data is stored in the relational database structure in the memory storage.

15. The computer system of claim 14, wherein the graph storage engine includes a conversion engine converting data in the relational database structure to the node data, edge data, and bindings data of the graph database structure.

16. The computer system of claim 12, wherein the node data includes parameters and arguments having corresponding binding edges.

17. The computer system of claim 12, wherein the user interface engine presents query results on a display as a visual graph.

18. The computer system of claim 17, wherein the user interface engine presents selectable visual objects on the display for selecting one or more predetermined queries.

19. A method for analyzing source code located in electronic memory storage of a computer system, wherein the computer system includes a user interface, a processor, and instructions stored in the electronic memory storage for execution by the processor, wherein the instructions are configured to execute a method comprising:

accessing the source code from the electronic memory storage;

analyzing code elements of the accessed source code to extract node data, edge data, and bindings data, wherein extraction of the node data, edge data, and bindings data comprises:

generating nodes of an abstract syntax tree (AST) from the accessed source code, wherein the AST is a tree model of a rudimentary node structure of the source code;

storing AST node data in a relational database structure in a relational database;

accessing the source code and the AST node data in the relational database;

generating the node data, the edge data, and the bindings data from the source code and the AST node data in the relational database;

the node data, edge data, and bindings data in a graph database structure in the electronic memory storage;

converting the node data, edge data, and bindings data, into a graph database structure; and storing the graph database structure in the electronic memory storage to facilitate human apprehension of the source code;

receiving a query at a user interface;

executing the query on the graph database structure using a graph query language;

presenting results of the query on the user interface as a visual graph having interconnected elements.

* * * * *